US010025343B2

(12) United States Patent
Rifani et al.

(10) Patent No.: US 10,025,343 B2
(45) Date of Patent: Jul. 17, 2018

(54) DATA TRANSFER BETWEEN ASYNCHRONOUS CLOCK DOMAINS

(75) Inventors: Michael C. Rifani, Beaverton, OR (US); Alan B. Kyker, Winters, CA (US); Alan S. Geist, Portland, OR (US); David M. Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 559 days.

(21) Appl. No.: 13/991,602

(22) PCT Filed: Dec. 28, 2011

(86) PCT No.: PCT/US2011/067612
§ 371 (c)(1),
(2), (4) Date: Jun. 4, 2013

(87) PCT Pub. No.: WO2013/100976
PCT Pub. Date: Jul. 4, 2013

(65) Prior Publication Data
US 2013/0254583 A1 Sep. 26, 2013

(51) Int. Cl.
*G06F 1/12* (2006.01)
*G06F 13/42* (2006.01)

(52) U.S. Cl.
CPC ............ *G06F 1/12* (2013.01); *G06F 13/4291* (2013.01)

(58) Field of Classification Search
CPC ............... G06F 1/12; G06F 1/04; G06F 13/38
See application file for complete search history.

(56) References Cited

U.S. PATENT DOCUMENTS

| 5,113,522 | A | * | 5/1992 | Dinwiddie, Jr. | ..... G06F 11/1641 713/2 |
| 5,754,833 | A | * | 5/1998 | Singh | ..................... G06F 13/405 713/400 |
| 6,055,285 | A | * | 4/2000 | Alston | .................... H04J 3/062 375/356 |
| 6,226,698 | B1 | * | 5/2001 | Yeung | ....................... G06F 5/10 365/239 |

(Continued)

FOREIGN PATENT DOCUMENTS

EP         0772133         5/1997

OTHER PUBLICATIONS

PCT International Search Report for PCT Counterpart Application No. PCT/US2011/067612, 3 pgs., (Sep. 27, 2012).

(Continued)

*Primary Examiner* — Zahid Choudhury
(74) *Attorney, Agent, or Firm* — Nicholson De Vos Webster & Elliott LLP

(57) ABSTRACT

Some implementations disclosed herein provide techniques and arrangements for transferring data between asynchronous clock domains. A synchronization signal may be generated by a first of the clock domains, and data may be transferred between the domains in response to the synchronization signal. Clock cycles of the second of the clock domains may be monitored in comparison to the synchronization signal to report the number of second clock domain cycles occurring per occurrence of the synchronization signal. This information may be recorded by testing and validation equipment to facilitate error analyses.

21 Claims, 7 Drawing Sheets

(56) References Cited

U.S. PATENT DOCUMENTS

| | | | | |
|---|---|---|---|---|
| 6,377,100 | B1* | 4/2002 | Fujieda | H03K 5/151 327/158 |
| 7,035,755 | B2 | 4/2006 | Jones et al. | |
| 7,134,035 | B2* | 11/2006 | Sharma | G06F 1/12 327/100 |
| 7,161,999 | B2 | 1/2007 | Parikh | |
| 7,310,396 | B1* | 12/2007 | Sabih | G06F 5/06 375/354 |
| 7,519,746 | B2* | 4/2009 | Shiraishi | G06F 5/14 710/52 |
| 8,301,932 | B2 | 10/2012 | Hay et al. | |
| 2003/0226052 | A1* | 12/2003 | Hill | G06F 1/12 713/400 |
| 2004/0225909 | A1* | 11/2004 | Adkisson | G06F 1/12 713/400 |
| 2004/0233865 | A1* | 11/2004 | Adkisson | G06F 1/12 370/324 |
| 2005/0156649 | A1* | 7/2005 | Tang | G06F 1/04 327/291 |
| 2005/0268135 | A1* | 12/2005 | Lamb | G06F 1/12 713/400 |
| 2006/0023820 | A1* | 2/2006 | Adkisson | H04L 7/02 375/354 |
| 2006/0164902 | A1* | 7/2006 | Fung | G06F 13/4059 365/221 |
| 2008/0234848 | A1* | 9/2008 | Kaczynski | G10H 1/08 700/94 |
| 2009/0259874 | A1* | 10/2009 | Owen | G06F 5/06 713/500 |

OTHER PUBLICATIONS

PCT Written Opinion of the International Searching Authority for PCT Counterpart Application No. PCT/US2011/067612, 4 pgs., (Sep. 27, 2012).

PCT Notification concerning Transmittal of International Preliminary Report on Patentability (Chapter I of the Patent Cooperation Treaty) for PCT Counterpart Application No. PCT/US2011/067612, 6 pgs., (Jul. 10, 2014).

* cited by examiner

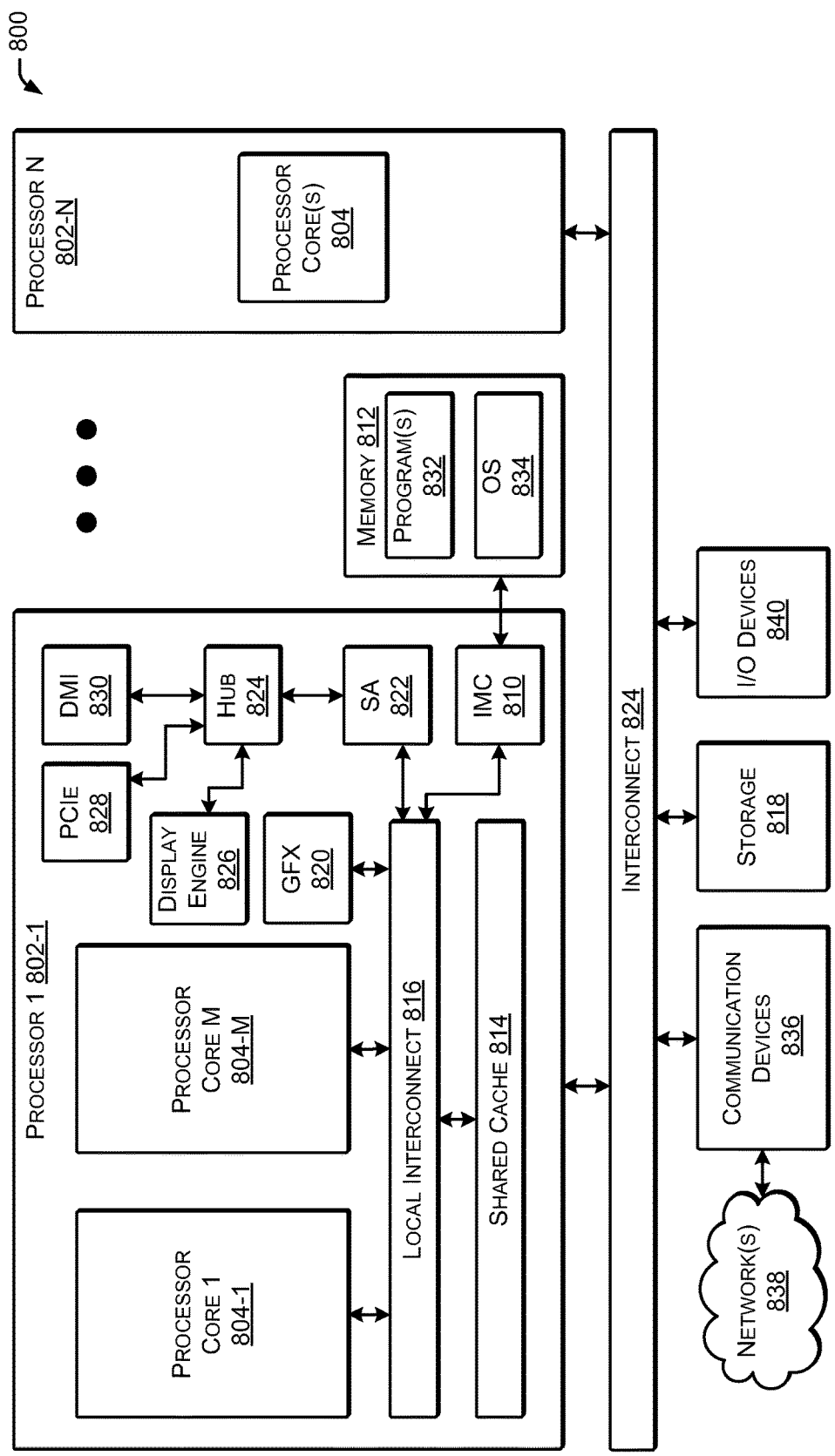

DATA TRANSFER BETWEEN ASYNCHRONOUS CLOCK DOMAINS

CROSS-REFERENCE TO RELATED APPLICATIONS

This patent application is a U.S. National Phase Application under 35 U.S.C. § 371 of International Application No. PCT/US2011/067612, filed Dec. 28, 2011, entitled DATA TRANSFER BETWEEN ASYNCHRONOUS CLOCK DOMAINS.

TECHNICAL FIELD

Some embodiments of the invention relate generally to asynchronous clock domains in systems or devices such as processors. More particularly, some embodiments of the invention relate to system or device configurations that facilitate testing of systems having asynchronous clock domains.

BACKGROUND ART

Integrated circuits traditionally use synchronous protocols for data transfer. Existing testing and validation technologies rely heavily on cycle-by-cycle, deterministic, synchronous models.

In a massively parallel architecture or a platform-level design, the number and diversity of interacting clock domains increases. Synchronizing all of the clock domains can be prohibitive because of engineering costs, power consumption, and project-level risks. Accordingly, such architectures and designs increasingly utilize multiple asynchronous clock domains. However, it is difficult to validate or emulate a fully asynchronous architecture with industry-standard validation hardware and software.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 8 is a block diagram of an illustrative architecture of a system in which the described techniques may be implemented.

DETAILED DESCRIPTION

Large-scale integrated circuits and other systems, including processors and other devices, increasingly use multiple asynchronous clock domains. Asynchronous clock domains often communicate with each other through an intermediate buffer that can be accessed from the different clock domains.

During development, devices and logic can be monitored to confirm that they operate as intended and produce expected results. However, available testing and diagnostic equipment is typically not designed for operation with asynchronous clock domains. Rather, such testing and diagnostic equipment typically relies on deterministic relationships between components and subsystems. Determinism in this context refers to the certainty of clock cycle on which a processor event occurs. It ensures repeatability of the event, which is fundamental to most high-volume manufacturing experiments involving that event. The non-deterministic nature of asynchronous clock domains presents a challenge, particularly when a developer wants to record and subsequently reproduce conditions and events leading to a detected fault or error.

The examples described below provide a way for test equipment to record and reproduce the runtime interactions between asynchronous clock domains. In certain embodiments, a first clock domain and a second clock domain transfer data in response to a synchronization signal that is generated synchronously with the clock of the first clock domain. During each period of the synchronization signal, referred to herein as a synchronization cycle, the number of clock cycles in the second clock domain may vary. However, the implementations described below generate a reporting output to indicate the correspondence between synchronization cycles and cycles of the second clock domain. The reporting output may be recorded by testing equipment, and allows the testing equipment to determine, in response to actual operating conditions, the number of clock cycles that occur in both the first and second clock domains during each synchronization period. This allows subsequent emulation of device operation, and recreation of recorded events.

Figure 1:
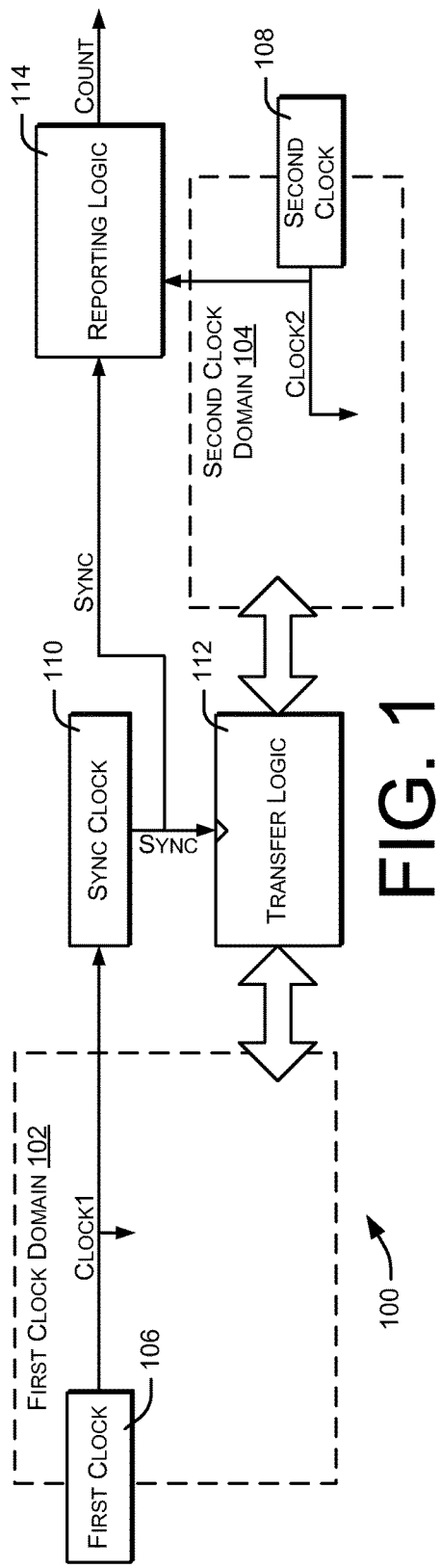
FIG. 1 is a block diagram illustrating an example of transferring data between asynchronous clock domains according to some implementations.

FIG. 1 illustrates a device or system 100 having a first clock domain 102 and a second clock domain 104. As an example, the system 100 may be a processor or similar type of device.

The first clock domain 102 has or is associated with a first clock 106 that generates a first clock signal C$_{LOCK}$1. The second clock domain 104 has or is associated with a second clock 108 that generates a second clock signal C$_{LOCK}$2. The first and second clock signals C$_{LOCK}$1 and C$_{LOCK}$2 are asynchronous, and therefore may not have deterministic frequency or phase relationships.

The first and second clock domains 102 and 104 may each have various components and/or elements, not shown, that operate in response to the respective clock signals C$_{LOCK}$1 and C$_{LOCK}$2.

The system 100 may have a synchronization clock 110 that is responsive to the first clock signal C$_{LOCK}$1 to generate a synchronization signal or pulse S$_{YNC}$. In some embodiments, the synchronization clock 110 may be implemented as a frequency divider, so that the synchronization pulse S$_{YNC}$ occurs at a lower frequency than that of the first clock signal C$_{LOCK}$1 while having a fixed phase relationship with the first clock signal C$_{LOCK}$1. For example, the synchronization clock 110 may produce a single synchronization pulse corresponding to every N cycles of the first clock signal C$_{LOCK}$1, where N is an integer. The periods defined by the synchronization signal will be referred to herein as synchronization periods or cycles.

The system 100 may also have data transfer logic 112 to transfer data between the first and second clock domains 102 and 104. The data transfer logic 112 may comprise one or more intermediate registers or buffers, and may be responsive to the synchronization pulse SYNC to initiate and/or perform data transfers or exchanges. During an exchange cycle, data may be transferred from the first clock domain 102 to the second clock domain 104, and/or from the second clock domain 104 to the first clock domain 102. A more specific implementation of the transfer logic 112 will be described below, in conjunction with the description of FIG. 4.

The system 100 may include reporting logic 114 that produces a clock count signal COUNT corresponding to each synchronization cycle. The clock count signal COUNT may be generated in response to the synchronization pulse SYNC and the second clock signal CLOCK2. The clock count signal COUNT may indicate, for every SYNC pulse or corresponding synchronization cycle, the number of occurring cycles of the second clock signal CLOCK2. Note that because of the asynchronous relationship between the first and second clock domains, the number of CLOCK2 cycles occurring between SYNC pulses may be indeterminate, and may vary over time. The clock count signal COUNT indicates the number of actually occurring CLOCK2 cycles corresponding to individual synchronization periods.

The clock count signal COUNT may be produced and output in synchronization with the first clock signal CLOCK1, the second clock signal CLOCK2, and/or the synchronization pulse SYNC.

The clock count signal COUNT provides a mechanism for correlating and reporting the runtime operations of the first clock domain 102 and the second clock domain 104, which can be recorded and used by testing and validation equipment to reproduce conditions and sequences that precede error conditions. Because the SYNC pulse is generated from the first clock signal CLOCK1, the number of CLOCK1 cycles per SYNC pulse is known. Because the second clock domain 104 is asynchronous with the first clock domain 102, the number of CLOCK1 cycles per SYNC pulse is potentially variable. However, the reporting logic 114 monitors actual observed performance, and provides the clock count signal COUNT as an indication of how many CLOCK2 cycles actually occur for each SYNC pulse. Thus, the two clock domains can be allowed to run asynchronously, while their operations can be monitored, recorded, and correlated to each other by validation and testing equipment: for every SYNC pulse, it is possible to determine and record the number of corresponding CLOCK1 and CLOCK2 cycles that actually occurred.

Figure 2:
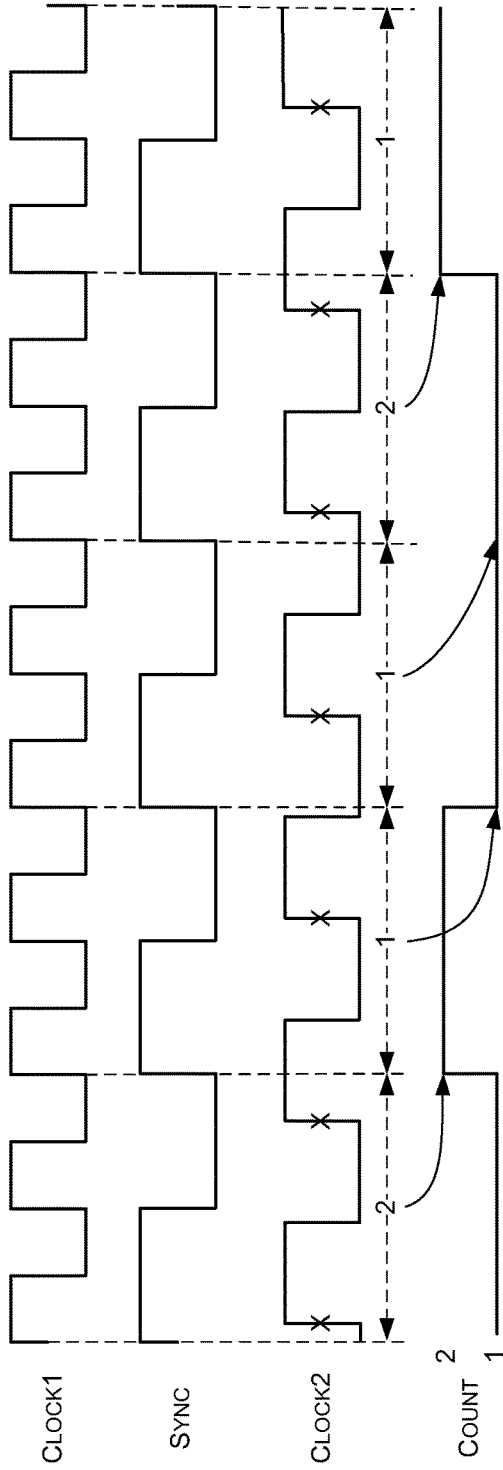
FIG. 2 is a timing diagram illustrating timing relationships in the system illustrated by FIG. 1.

FIG. 2 illustrates signal relationships in the system 100. Note that in this illustration, signals are considered to become active on their rising edges.

FIG. 2 shows relationships between the CLOCK1, SYNC, CLOCK2, and COUNT signals of FIG. 1.

The CLOCK1 signal may be a cyclical, repetitive, and/or periodic signal such as the square wave illustrated. The synchronization pulse SYNC may similarly be a cyclical, repetitive, or periodic signal, such as a repetitively or periodically occurring pulse. As described above, the synchronization pulse SYNC may be synchronized with the CLOCK1 signal, and may be at a lower frequency than that of the CLOCK1 signal. In the illustrated example, the synchronization pulse SYNC is repeated once for every two cycles of the CLOCK1 signal. More generally, the synchronization pulse SYNC may occur once for every N cycles of the CLOCK1 signal, where N is an integer. Each synchronization pulse SYNC corresponds to a respective synchronization cycle.

The CLOCK2 signal may be a cyclical, repetitive, and/or periodic signal such as the square wave illustrated. The CLOCK2 signal may have a different frequency than that of the CLOCK1 signal, and may have an indeterminate or variable phase relationship with both the CLOCK1 signal and the SYNC signal.

In this example, the frequency of the CLOCK2 signal is such that it occurs either once or twice for each repetition, period, or cycle of the SYNC pulse. At the rising edge of each SYNC pulse, the COUNT signal is updated to indicate the actual number of CLOCK2 cycles (indicated by x's in FIG. 2) that occurred during the previous SYNC period, where synchronization periods are defined by the rising edges of the SYNC signal (indicated by dashed vertical lines in FIG. 2). A low value of the COUNT signal in this example corresponds to one cycle of the CLOCK2 signal, and a high value of the COUNT signal corresponds to two cycles of the CLOCK2 signal. The COUNT signal may of course be used to indicate different CLOCK2 counts, in situations where the nominal frequencies of the CLOCK1 and CLOCK2 signals are different than shown. In addition, the COUNT signal may in some situations comprise a multi-bit signal or value.

Figure 3:
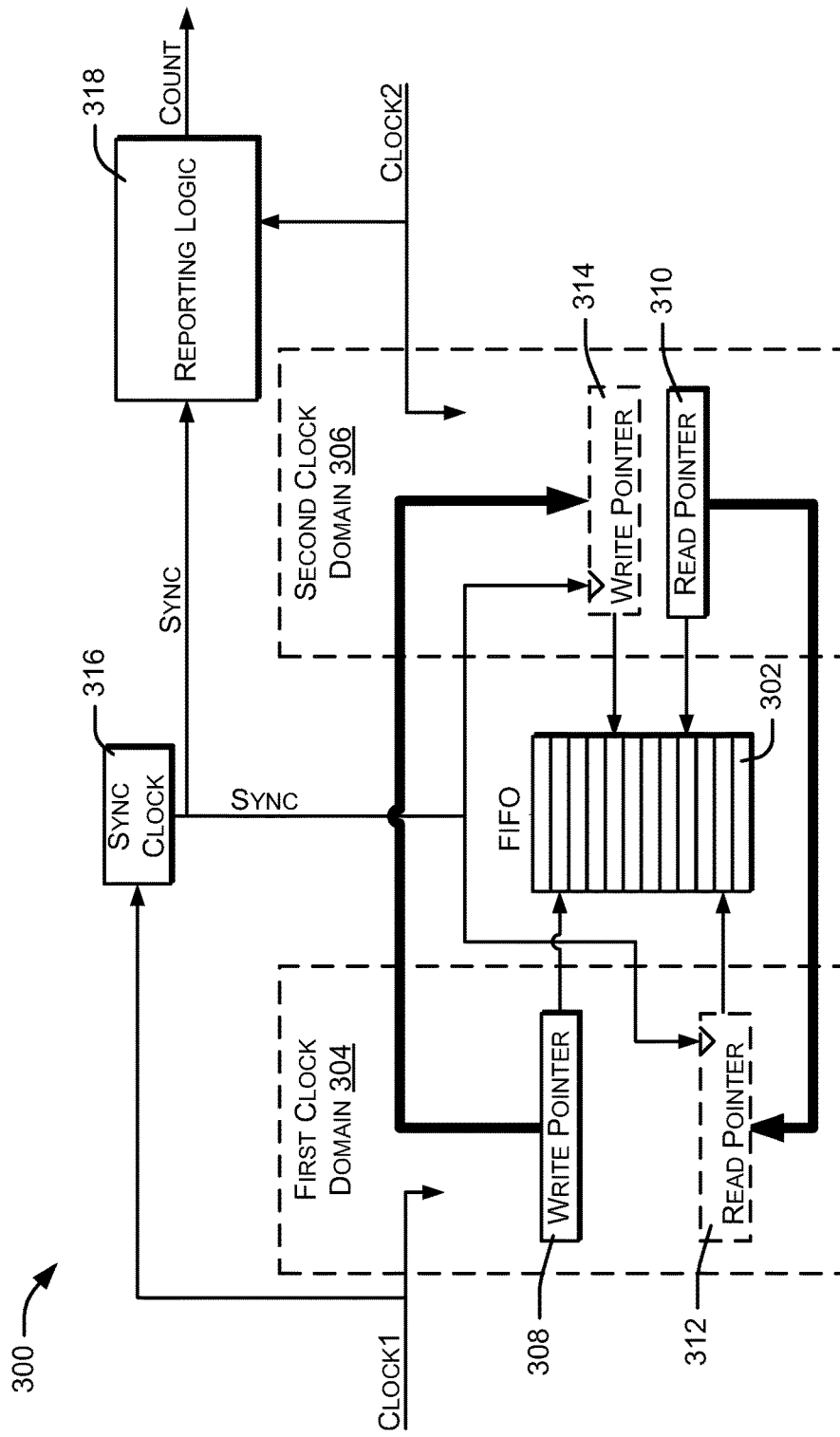
FIGS. 3-5 are block diagrams illustrating further examples of transferring data between asynchronous clock domains according to some implementations.

FIG. 3 illustrates an example device or system 300 in which an intermediate storage element or buffer 302 is used for asynchronously transferring data between a first clock domain 304 and an asynchronous second clock domain 306. The example device or system 300 uses the techniques described above to transfer buffer pointers between the first and second clock domains 304 and 306.

The intermediate storage buffer 302 may comprise an elastic buffer such as a first-in-first-out (FIFO) buffer. In the given example, the first clock domain 304 writes data to the FIFO buffer 302 in synchronization with a first clock signal CLOCK1. The second clock domain 306 reads data from the FIFO buffer in synchronization with a second clock signal CLOCK2. The first and second clock signals CLOCK1 and CLOCK2 may be asynchronous.

In order to coordinate writing and reading between the first and second clock domains 304 and 306, write and read pointers are maintained within the first and second clock domains 304 and 306. More specifically, the first clock domain 304 maintains a write pointer 308, indicating the address of the next position of the FIFO buffer 302 to be written. After the first clock domain 304 writes to this position of the FIFO buffer 302, the write pointer 308 is incremented.

The second clock domain 306 maintains a read pointer 310, indicating the address of the next position of the FIFO buffer 302 to be read. After the second clock domain 306 reads from this position of the FIFO buffer 302, the read pointer 310 is incremented.

The first clock domain 304 may also have a shadow or duplicate read pointer 312, which is updated from time to time to reflect the value of the read pointer 310 of the second clock domain 306. To prevent overwriting data that has not yet been read by the second clock domain 306, the first clock domain 304 does not perform writes to locations beyond the address indicated by the shadow read pointer 312.

Similarly, the second clock domain 306 may have a shadow or duplicate write pointer 314, which is updated from time to time to reflect the value of the write pointer 308 of the first clock domain 304. To avoid reading invalid data, the second clock domain 306 does not perform reads from locations beyond the address indicated by the shadow write pointer 314.

The system 100 may have a synchronization clock 316, which is configured similarly to the synchronization clock 110 of FIG. 1 to generate a synchronization signal or pulse SYNC based on the first clock signal CLOCK1. In this embodiment, the SYNC pulse is used to update the shadow read pointer 312 and the shadow write pointer 314. More specifically, the SYNC pulse is used to clock or latch data from the read pointer 310 into the shadow read pointer 312, and from the write pointer 308 into the shadow write pointer 314.

The shadow read pointer 312 may comprise a latch or register that receives the current value of the read pointer 310 from the second clock domain 306. This value is captured by the latch or register 312 upon or in response to receiving the SYNC pulse. Similarly, the shadow write pointer 314 may comprise a latch or register configured to receive the current value of the write pointer 308 from the first clock domain 304. This value is captured by the latch or register 314 upon or in response to receiving the SYNC pulse.

Similar to the embodiment of FIG. 1, the system 300 may have reporting logic 318 to report the number of CLOCK2 cycles that occur during every repetition or period of the SYNC signal. The reporting logic 318 may generate a clock count signal COUNT to indicate correlation between clock cycles of the first clock domain 304 and clock cycles of the second clock domain 306. As described above, the COUNT signal can be used by testing and validation equipment to record and later emulate conditions and sequences that precede error conditions.

The shadow read pointer 312 and the shadow write pointer may be clocked directly by the SYNC pulse, or may be clocked in synchronization with the respective clock domains in response to respective SYNC pulses. For example, the read pointer 312 may be clocked by the CLOCK1 signal in response to each SYNC pulse. Similarly, shadow the write pointer 314 may be clocked by the CLOCK2 signal in response to each SYNC pulse.

Figure 4:
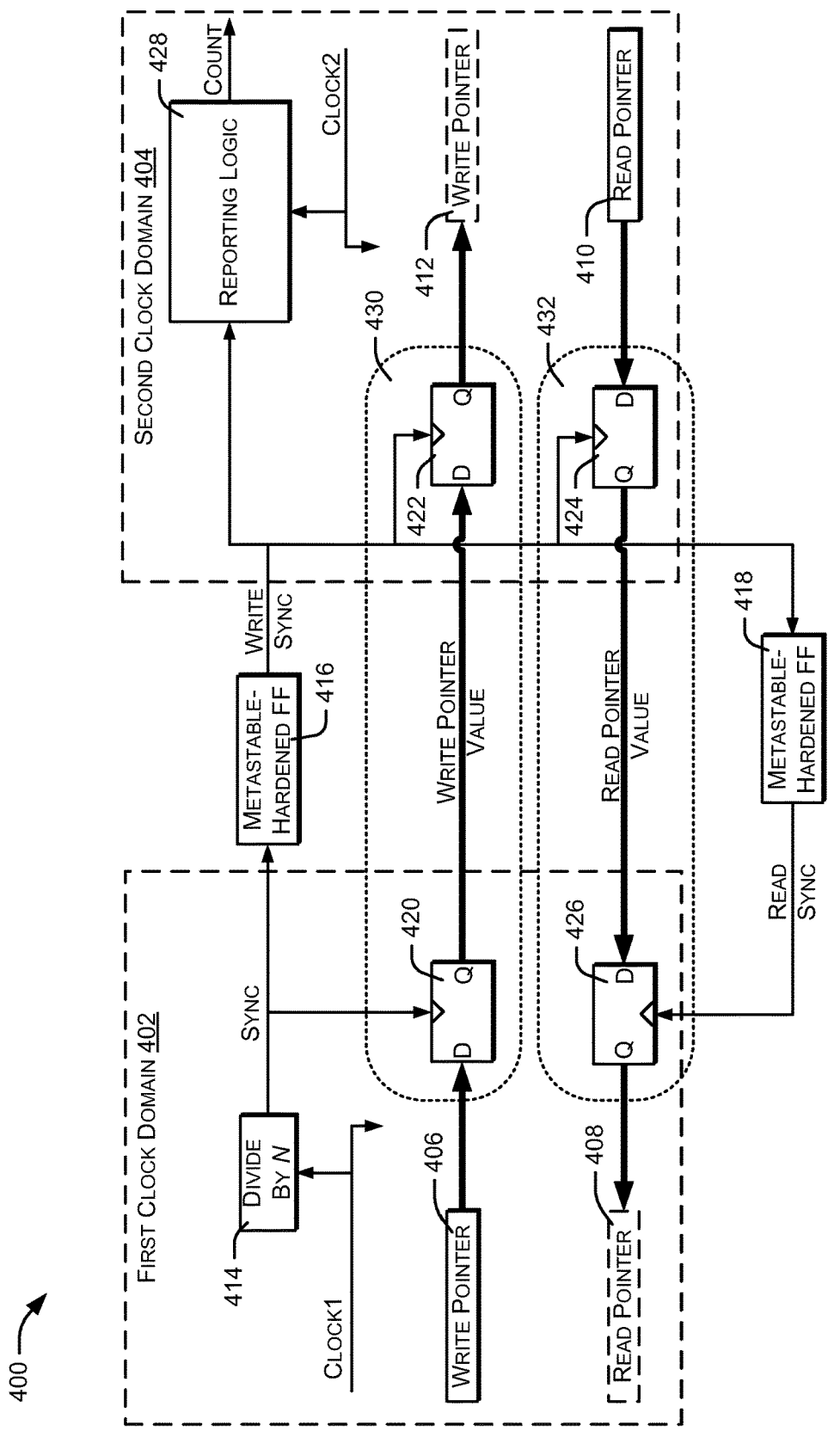

FIG. 4 illustrates an example implementation of a system 400 that demonstrates the concepts described above. The system 400 has a first clock domain 402 and a second clock domain 404. The first clock domain 402 operates in response to a first clock signal CLOCK1. The second clock domain 404 operates in response to an asynchronous second clock signal CLOCK2.

The first and second clock domains 402 and 404 transfer data using an intermediate elastic buffer or FIFO (not shown), which may be similar to the FIFO buffer 302 of FIG. 3. The buffer is addressed by pointers as described with reference to FIG. 3. Specifically, the first clock domain 402 maintains a write pointer 406 and a shadow read pointer 408. The second clock domain 404 maintains a read pointer 410 and a shadow write pointer 412. The shadow write pointer 412 is updated periodically to reflect the value of the write pointer 406. The shadow read pointer 408 is updated periodically to reflect the value of the read pointer 410.

In this example, a synchronization clock is implemented as a divide-by-N frequency divider 414 within the first clock domain 402. The frequency divider 414 generates SYNC signal as a function of the first clock signal CLOCK1. The SYNC signal may comprise a periodic or repetitive pulse that occurs at a lower frequency than the CLOCK1 signal, while also being synchronous with the CLOCK1 signal.

The SYNC signal is communicated or propagated from the first clock domain 402, to the second clock domain 404, and then back to the first clock domain 402. More specifically, SYNC signal is transmitted from the first clock domain 402 to the second clock domain 404 through a first metastable-hardened flip-flop 416. The flip-flop 416 produces a WRITE SYNC signal, which may be a delayed version of the SYNC signal. The WRITE SYNC signal is transmitted from the second clock domain 404 back to the first clock domain 402 through a second metastable-hardened flip-flop 418. The flip-flop 418 produces a READ SYNC signal, which may be a delayed version of the WRITE SYNC signal.

In this embodiment, DQ latches are used to transfer pointers between the first and second clock domains 402 and 404, in response to the various versions or instances of the synchronization signal, which include the SYNC signal, the WRITE SYNC signal, and the READ SYNC signal.

A first latch or transfer register 420, within the first clock domain 402, receives at its input the value of the write pointer 406 of the first clock domain 402. A synchronization cycle is initiated by the SYNC signal, which latches the write pointer value into the latch 420 so that it can be received and read by the second clock domain 404.

A second latch or transfer register 422, within the second clock domain 404, receives the write pointer value from the first latch 420, and is responsive to the WRITE SYNC signal to latch this value.

A third latch or transfer register 424, within the second clock domain 404, receives at its input the value of the read pointer 410 of the second clock domain 404. This value is latched into the third latch 424 in response to the WRITE SYNC signal, so that the value can be received and read by the first clock domain 402.

A fourth latch or transfer register 426, within the first clock domain 402, receives the read pointer value from the third latch 424, and is responsive to the READ SYNC signal to latch the read pointer value from the third latch 424.

These events can be summarized as the following sequence of actions, which together may be referred to as a synchronization cycle in this embodiment:

SYNC initiates the synchronization cycle and latches the write pointer into the output latch 420;

WRITE SYNC latches the write pointer from the output latch 420 into the input latch 422;

WRITE SYNC also latches the read pointer 410 into the output latch 424; and

READ SYNC latches the read pointer from the output latch 424 into the input latch 426.

The second clock domain 404 may have reporting logic 428, similar to the reporting logic described above. The reporting logic 428 is responsive to the WRITE SYNC signal and to the second clock CLOCK2, and produces a COUNT output indicating, for each cycle or pulse of WRITE SYNC, the number of corresponding CLOCK2 cycles that occurred during the previous WRITE SYNC cycle or synchronization cycle.

The value of N can be chosen based on the ratio of the first clock signal CLOCK1 and the second clock signal CLOCK2, in a manner that minimizes the potential for data overwrites and/or data starvation. If the synchronization pace defined by the SYNC signal is too fast, the first clock domain may initiate a synchronization cycle before the second clock domain has had a chance to process a previous synchronization cycle. If the synchronization pace defined by the SYNC signal is too slow, the second clock domain may at times be starved for data, even though there is unread data in the FIFO buffer.

The elements within the dashed box 430 may be considered or referred to as write pointer transfer logic. The elements within the dashed box 432 may be considered or referred to as read pointer transfer logic. The write and read pointer logic 430 and 432 represent an example implementation of the transfer logic 112 shown in FIG. 1.

Figure 5:
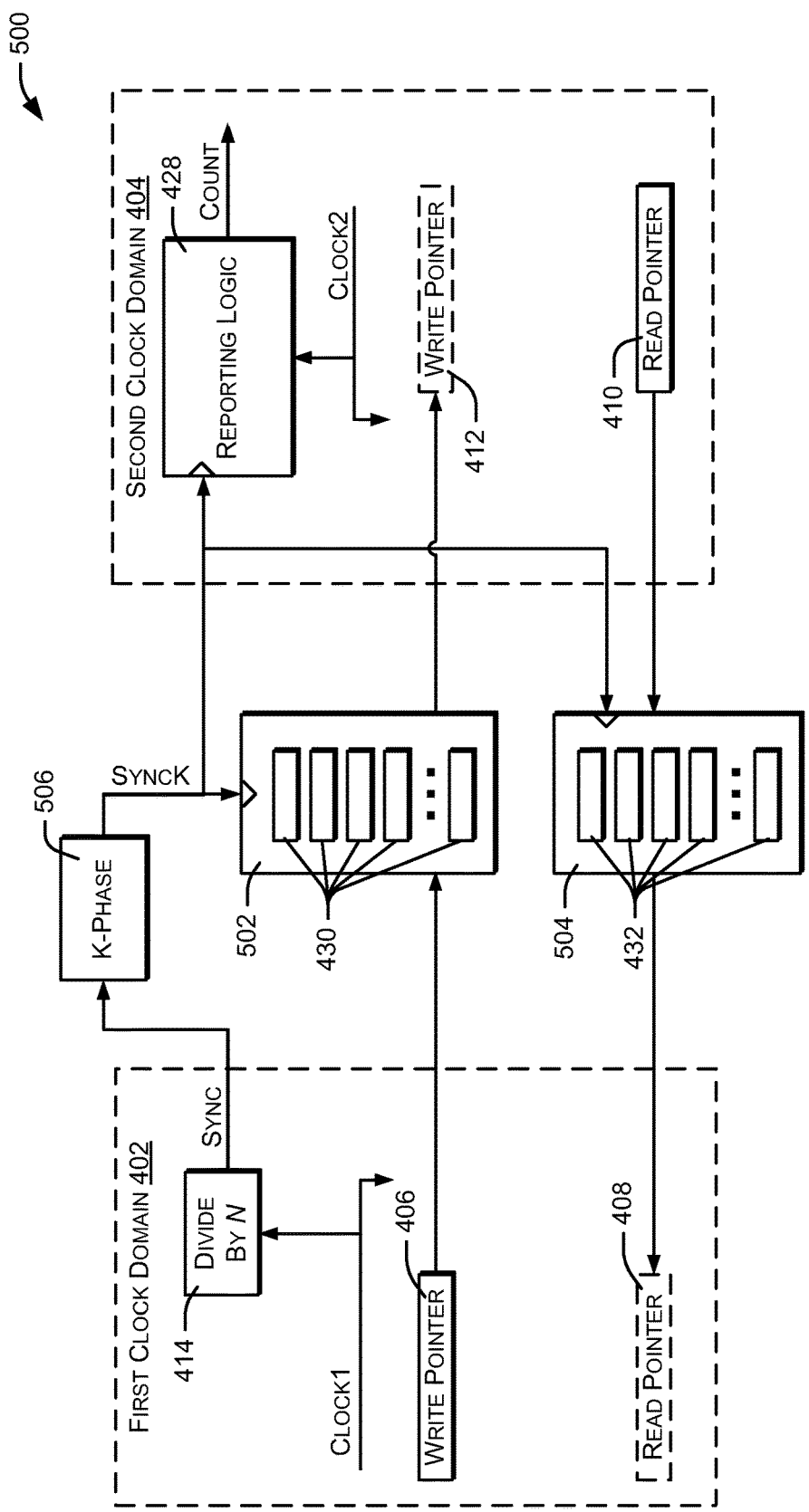

FIG. 5 illustrates an example embodiment 500, which is a variation of the embodiment of FIG. 4. In FIG. 5, the write and read pointer logic 430 and 432 are each replicated K times to produce a multi-register write buffer 502 and a multi-register read buffer 504. Each of these buffers may be configured to operate in FIFO fashion, allowing the first and second clock domains 402 and 404 to process synchronization cycles at different rates. For example, this may allow the first clock domain 402 to initiate synchronization cycles at a rate that is faster than the rate at which the second clock domain 404 is able to process the synchronization cycles.

The embodiment of FIG. 5 includes a K-Phase clock generator 506 that is responsive to the single-bit S<sub>YNC</sub> signal to create a multi-bit S<sub>YNC</sub>K signal. The S<sub>YNC</sub>K signal comprises K signal bits, which are used to clock respective instances of write pointer logic 430 and read pointer logic 432.

Figure 6:
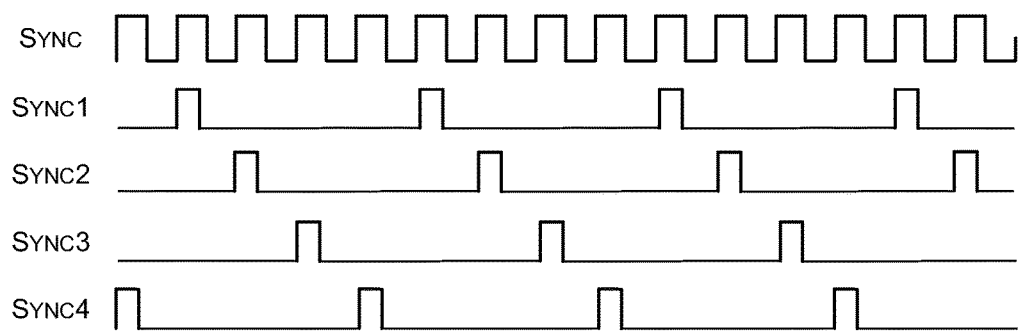
FIG. 6 is a timing diagram illustrating timing relationships between the S$_{YNC}$ and S$_{YNC}$K signals of FIG. 5.

FIG. 6 illustrates the relationship of the individual bits of the S<sub>YNC</sub>K signal to the single-bit S<sub>YNC</sub> signal. This example assumes K=4. The S<sub>YNC</sub>K signal comprises K individual bits or signals, referred to as S<sub>YNC</sub>1, S<sub>YNC</sub>2, S<sub>YNC</sub>3, and S<sub>YNC</sub>4. Each of the individual S<sub>YNC</sub>K signals is generated by dividing the S<sub>YNC</sub> signal by K. In addition, the individual S<sub>YNC</sub>K signals are staggered from each other, so that a single S<sub>YNC</sub>K signal is generated for each occurrence of the S<sub>YNC</sub> signal.

Referring again to FIG. 5, each of the write transfer logic instances 430 may correspond to and be responsive to a different one of the individual S<sub>YNC</sub>K signal bits. Similarly, each of the read transfer logic instances 432 may be responsive to a different one of the individual S<sub>YNC</sub>K signal bits. This arrangement effectively implements FIFO logic for the transferred pointers, allowing them to be written and read at different paces by the first and second clock domains 402 and 404.

Figure 7:
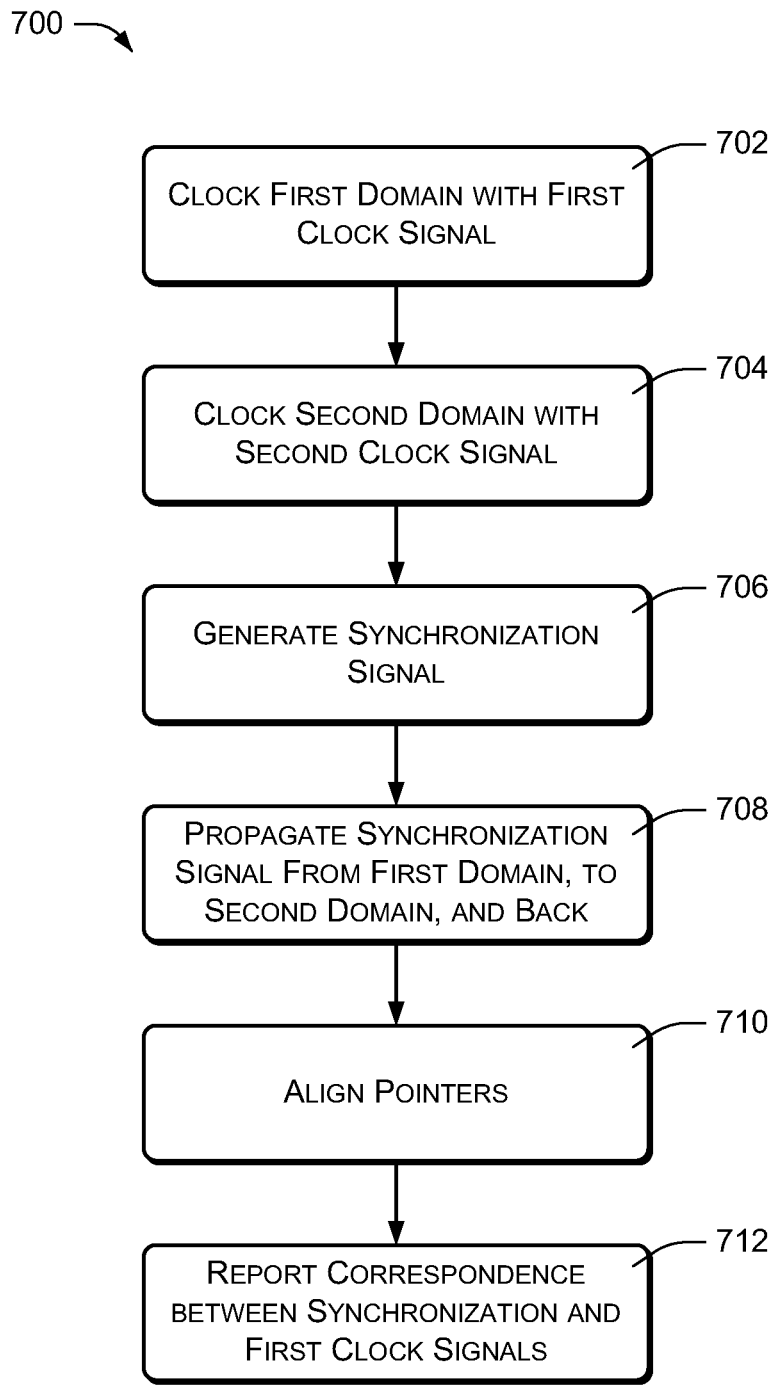
FIG. 7 is a flow diagram illustrating an example process of transferring data between asynchronous clock domains according to some implementations.

FIG. 7 illustrates an example of a method 700 for transferring data between asynchronous clock domains. An action 702 comprises clocking a first clock domain with a first cyclical clock signal. An action 704 comprises clocking a second clock domain with a second cyclical clock signal. As discussed above, the first and second cyclical clock signals may be asynchronous.

An action 706 comprises generating a synchronization signal. The synchronization signal may be synchronous with the first clock signal, and may be generated by dividing the frequency of the first clock signal by an integer N. Thus, the first clock signal may have a frequency that is an fixed integer multiple of the synchronization signal.

An action 708 may comprise propagating the synchronization signal from the first clock domain to the second clock domain, and then from the second clock domain back to the first clock domain.

An action 710 may comprise aligning the pointers between the first and second clock domains in response to the synchronization signal. A first buffer pointer may be transferred from the first clock domain to the second clock domain response to propagating the synchronization signal from the first clock domain to the second clock domain. A second buffer pointer may be transferred from the second clock domain to the first clock domain in response to propagating the synchronization signal from the second clock domain back to the first clock domain.

An action 712 may comprise indicating and/or reporting the correspondence between the synchronization signal and cycles of the second clock signal. For example, the action 710 may comprise indicating, for each occurrence of the synchronization signal, the number of corresponding cycles of the second clock signal.

FIG. 8 is a block diagram of an illustrative architecture of a system 800 in which the techniques described above may be implemented. The system 800 may include one or more processors 802-1, . . . , 802-N (where N is a positive integer ≥1), each of which may include one or more processor cores 804-1, . . . , 804-M (where M is a positive integer ≥1). In some implementations the processor(s) 802 may be a single core processor, while in other implementations, the processor(s) 802 may have a large number of processor cores, each of which may include some or all of the components illustrated in FIG. 8.

The processor(s) 802 and processor core(s) 804 can be operated, via an integrated memory controller (IMC) 810 in connection with a local interconnect 816, to read and write to a memory 812. The processor(s) 802 and processor core(s) 804 can also execute computer-readable instructions stored in the memory 812 or other computer-readable media. The memory 812 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 804, in some implementations, the multiple processor cores 804 may share a shared cache 814, which may be accessible via the local interconnect 816.

Storage 818 may be provided for storing data, code, programs, logs, and the like. The storage 818 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 800, the memory 812 and/or the storage 818 may be a type of computer readable storage media and may be a non-transitory media.

In various embodiments, the local interconnect 816 may also communicate with a graphical controller or graphics processing unit 820 to provide graphics processing. Additionally, in some embodiments, the local interconnect 816 may communicate with a system agent 822. The system agent 822 may be in communication with a hub 824, which connects a display engine 826, a PCIe 828, and a DMI 830.

The memory 812 may store functional components that are executable by the processor(s) 802. In some implementations, these functional components comprise instructions or programs 832 that are executable by the processor(s) 802. The example functional components illustrated in FIG. 8 further include an operating system (OS) 834 to manage operation of the system 800.

The system 800 may include one or more communication devices 836 that may include one or more interfaces and hardware components for enabling communication with various other devices over a communication link, such as one or more networks 838. For example, communication devices 836 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 800 may further be equipped with various input/output (I/O) devices 840. Such I/O devices 840 may include a display, various user interface controls (e.g., buttons, joystick, keyboard, touch screen, etc.), audio speakers, connection ports and so forth. An interconnect 824, which may include a system bus, point-to-point interfaces, a chipset, or other suitable connections and components, may be provided to enable communication between the processors 802, the memory 812, the storage 818, the communication devices 836, and the I/O devices 840.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A processor, comprising:
    first and second clock domains to be clocked by first and second asynchronous clock signals, respectively;
    first logic to transfer data between the first and second clock domains in response to a synchronization signal, each cycle of the synchronization signal corresponding to a fixed multiple of first clock signal cycles, wherein the synchronization signal is to be propagated from the first clock domain to the second clock domain to transfer a buffer write pointer from the first clock domain to the second clock domain, and then from the second clock domain to the first clock domain to transfer a buffer read pointer from the second clock domain to the first clock domain; and
    second logic to indicate cycles of the second clock signal that correspond to the synchronization signal.

2. The processor of claim 1, wherein the synchronization signal comprises a single bit.

3. The processor of claim 1, wherein the synchronization signal comprises a repeating pulse.

4. The processor of claim 1, wherein:
    the synchronization signal comprises multiple bits; and
    the first logic comprises transfer registers corresponding to the multiple bits of the synchronization signal.

5. The processor of claim 1, further comprising an elastic buffer to be accessed asynchronously by the first and second clock domains, wherein the data exchanged between the first and second clock domains comprises one or more pointers to the elastic buffer.

6. The processor of claim 1, further comprising an elastic buffer to be accessed asynchronously by the first and second clock domains, wherein the data exchanged between the first and second clock domains comprises read and write pointers associated with the elastic buffer.

7. The processor of claim 1, wherein the synchronization signal is to be propagated from the first clock domain to the second clock domain, and then from the second clock domain to the first clock domain.

8. The processor of claim 1, wherein the synchronization signal is synchronous with the first clock signal.

9. The processor of claim 1, further comprising a frequency divider to generate the synchronization signal in response to the first clock signal.

10. A system, comprising:
    a buffer to transfer data between first and second clock domains, wherein the first and second clock domains are clocked by first and second cyclical clock signals, respectively, and wherein the buffer is indexed by one or more buffer pointers;
    a synchronization clock to generate a synchronization signal based at least in part on the first clock signal, each cycle of the synchronization signal corresponding to a fixed multiple of first clock signal cycles;
    synchronization logic to transfer the one or more buffer pointers between the first and second timing domains in response to the synchronization signal, wherein the synchronization signal is to be propagated from the first clock domain to the second clock domain to transfer a buffer write pointer from the first clock domain to the second clock domain, and then from the second clock domain to the first clock domain to transfer a buffer read pointer from the second clock domain to the first clock domain; and
    reporting logic to indicate correlation of the second clock signal to the synchronization signal.

11. The system of claim 10, wherein the synchronization signal comprises a single bit.

12. The system of claim 10, wherein the synchronization logic comprises multiple transfer registers.

13. The system of claim 10, wherein the synchronization signal comprises pulses, and wherein the reporting logic is to indicate how many cycles of the second clock signal correspond to each of the pulses.

14. The system of claim 10, wherein the buffer comprises a first-in-first-out buffer, and the buffer pointers comprise read and write pointers.

15. The system of claim 10, wherein the synchronization clock comprises a frequency divider to generate the synchronization signal in response to at least the first clock signal.

16. The system of claim 10, wherein the synchronization signal is to be propagated from the first clock domain to the second clock domain, and then from the second clock domain to the first clock domain.

17. The system of claim 10, wherein the synchronization signal is to be synchronous with the first clock signal.

18. A method, comprising:
    clocking a first clock domain with a first cyclical clock signal;
    clocking a second clock domain with a second cyclical clock signal, wherein the first and second cyclical clock signals are asynchronous;
    generating a synchronization signal based at least in part on the first clock signal, each cycle of the synchronization signal corresponding to a fixed multiple of first clock signal cycles;
    propagating the synchronization signal from the first clock domain to the second clock domain and back to the first clock domain;
    transferring data between the first and second clock domains in response to the synchronization signal; and
    reporting correspondence between the synchronization signal and cycles of the second clock signal.

19. The method of claim 18, further comprising generating the synchronization signal in synchronization with the first clock signal.

20. The method of claim 18, wherein the synchronization signal comprises cycles that are synchronous with the first clock signal, and the reporting comprises indicating how many cycles of the second clock signal occur during each cycle of the synchronization signal.

21. The method of claim 18, further comprising:
    transferring a first buffer pointer from the first clock domain to the second clock domain in response to propagating the synchronization signal from the first clock domain to the second clock domain; and transferring a second buffer pointer from the second clock domain to the first clock domain in response to propagating the synchronization signal back to the first clock domain.

\* \* \* \* \*